US011781712B1

(12) United States Patent
Curry

(10) Patent No.: US 11,781,712 B1
(45) Date of Patent: Oct. 10, 2023

(54) ARM SUPPORT DEVICE

(71) Applicant: Christian Curry, Concord, CA (US)

(72) Inventor: Christian Curry, Concord, CA (US)

(*) Notice: Subject to any disclaimer, the term of this patent is extended or adjusted under 35 U.S.C. 154(b) by 79 days.

(21) Appl. No.: 17/490,898

(22) Filed: Sep. 30, 2021

(51) Int. Cl.
F16M 13/04 (2006.01)
A45F 3/14 (2006.01)

(52) U.S. Cl.
CPC ............ F16M 13/04 (2013.01); A45F 3/14 (2013.01); A45F 2003/142 (2013.01)

(58) Field of Classification Search
CPC ........ A45F 3/14; A45F 2003/142; A45F 5/00; F16M 13/04
See application file for complete search history.

(56) References Cited

U.S. PATENT DOCUMENTS

| | | | | |
|---|---|---|---|---|
| 3,661,308 A * | 5/1972 | Walters | ............ | F16M 11/2092 224/908 |
| 3,784,068 A * | 1/1974 | Pistilli | ............ | F16M 13/00 224/908 |
| 4,033,488 A * | 7/1977 | Brewer | ............ | A45F 5/00 224/259 |
| 4,280,645 A * | 7/1981 | Goodden | ............ | A45F 3/14 224/267 |
| 4,637,536 A * | 1/1987 | Wong | ............ | G02B 23/18 224/261 |
| 4,715,293 A * | 12/1987 | Cobbs | ............ | F16M 13/00 224/265 |
| 5,042,763 A * | 8/1991 | Wong | ............ | F16M 13/022 224/265 |
| 5,111,983 A * | 5/1992 | Simmons | ............ | F16M 13/04 348/E5.025 |
| 5,724,225 A * | 3/1998 | Hrusoff | ............ | A45F 3/14 D3/276 |
| 6,041,444 A * | 3/2000 | McKinney | ............ | A45F 3/14 2/310 |
| 10,314,382 B1 * | 6/2019 | Riedel | ............ | A45F 5/021 |
| 10,596,059 B2 * | 3/2020 | Angold | ............ | A45F 3/08 |
| 2004/0031183 A1 * | 2/2004 | Cain | ............ | F41C 33/001 42/94 |

* cited by examiner

Primary Examiner — Robert Sandy
Assistant Examiner — Louis A Mercado
(74) Attorney, Agent, or Firm — Theodore J. Bielen, Jr.

(57) ABSTRACT

A device for supporting arms utilizing a pair of platforms. The platforms are horizontally rotatably connected to a spanning bar which in turn depends from straps. The platforms are further connected relative to the bar to rotate vertically.

3 Claims, 2 Drawing Sheets

ARM SUPPORT DEVICE

CROSS-REFERENCES TO RELATED APPLICATIONS

The present application claims the benefit of U.S. Provisional Application 63/087,010, filed 2 Oct. 2020.

BACKGROUND OF THE INVENTION

The present application relates to a novel and useful arm support device which may be employed to stabilize objects such as binoculars, cameras, guns, and the like being held by a user.

Certain manually held objects require steadying for proper usage. For example, binoculars, cameras, guns, and the like fall into this usage category. In the past, items, such as binoculars, have been supported on a user by the use of a strap that normally encircles the neck of the user and connects to two points on the set of binoculars. The same structure applies to handheld cameras, such as single lens reflex cameras, having elongated lenses attached thereto. Although straps and harnesses for these items successfully hold the particular item to the body of the user when not in use, they lack support to the arms of the users when in use. In the past, such steadying or supporting of the arms was achieved by the user forcing the arms against the torso of the user and tensing the muscles in the arms. Needless to say, such a technique is only partially successful in keeping the item, such as the binoculars, free of shaking or movement. Often, the user seeks an external platform, such as a table, sill, and the like, to steady the object held by the user. In many instances, such external platforms are not available. This is especially true when the user is located outdoors or in the field for the purpose of hiking, hunting, birdwatching, or the like.

A device for resting the arms of the user in order to accurately manipulate an optical object would be a notable advance in the field of unitary harnesses and supports.

SUMMARY OF THE INVENTION

In accordance with the present application, a novel and useful support device for resting the arms of a user is of optically dependent items hereinafter provided.

The device includes the provision of a first and second platform each having a distal portion and a proximal portion. Each of the first and second platforms includes surfaces for individually supporting each of the arms of the user. The surfaces may also be provided with padding for other vibration absorbing layers.

A first plate and a second plate are also utilized in the device of the present application. The first plate is rotatably attached to the proximal portion of the first platform while the second plate is rotatably attached to the proximal portion of the second platform. Thus, the rotatable attachment of the first and second platforms to the first and second plates allows the first and second platforms to move generally horizontally relative to the torso of the user.

First and second flanges are also found in the device of the present application and are connected to and extend outwardly from the first and second plates, respectively. A bar is also utilized in the device of the present application. The first and second flanges each rotatably attach to the bar, thus allowing the platforms to rotate in a generally vertical direction. The bar also forms a space relative to the torso of the user, which is intended for confining a case adjacent the torso of the user. Normally, such case serves as a storage for the optical item being employed by the user. Typically, a sling or strap connected to the case is fastened to the torso of the user or strapped about the neck of the user when not in use.

Straps are also employed in the present application and may be fastened to the torso of the user or looped around the neck of the user. For example, first and second straps may be rotatably connected to third and fourth flanges extending from the first and second plates, respectively. Thus, when the platform is rotated in a generally vertical direction, such platform would move about axes extending through the first and third flanges and the second and fourth flanges connected to the first and second plates, respectively. Third and fourth straps may also be employed to connect the bar to the first and second straps in order to further position the first and second platforms as well as the spanning bar between them.

It may be apparent that a novel and useful support device for resting the two arms of the user when using a visually dependent device has been hereinabove described.

It is therefore an object of the present application to provide a support apparatus for an optical device that provides stability for the user as well as the optical device being held by the user.

Another object of the present application is to provide a support device for resting the two arms of a user that is easily folded into a compact configuration for traveling and for storage.

Another object of the present application is to provide a support device for resting the two arms of a user which may include a neck strap and pad which is fully adjustable.

A further object of the present application is to provide a support device for resting the two arms of a user that creates elbow rest for the user that are rotatable in and away, generally horizontally, from the user itself.

Another object of the present application is to provide a support device for resting the two arms of a user which is also capable of confining a case adjacent to the torso of the user through the use of a spanning bar extending between arm resting platforms of the support device.

The application possesses other objects and advantages especially as concerns particular characteristics and features thereof which will become apparent as the specification continues.

For a better understanding of the application, reference is made to the following detailed description of the preferred embodiments thereof which should be references to the prior described drawings.

DETAILED DESCRIPTION OF THE PREFERRED EMBODIMENTS

Various aspects of the present application will evolve from the following detailed description of the preferred embodiments thereof which should be referenced to the prior delineated drawings.

Figure 1:
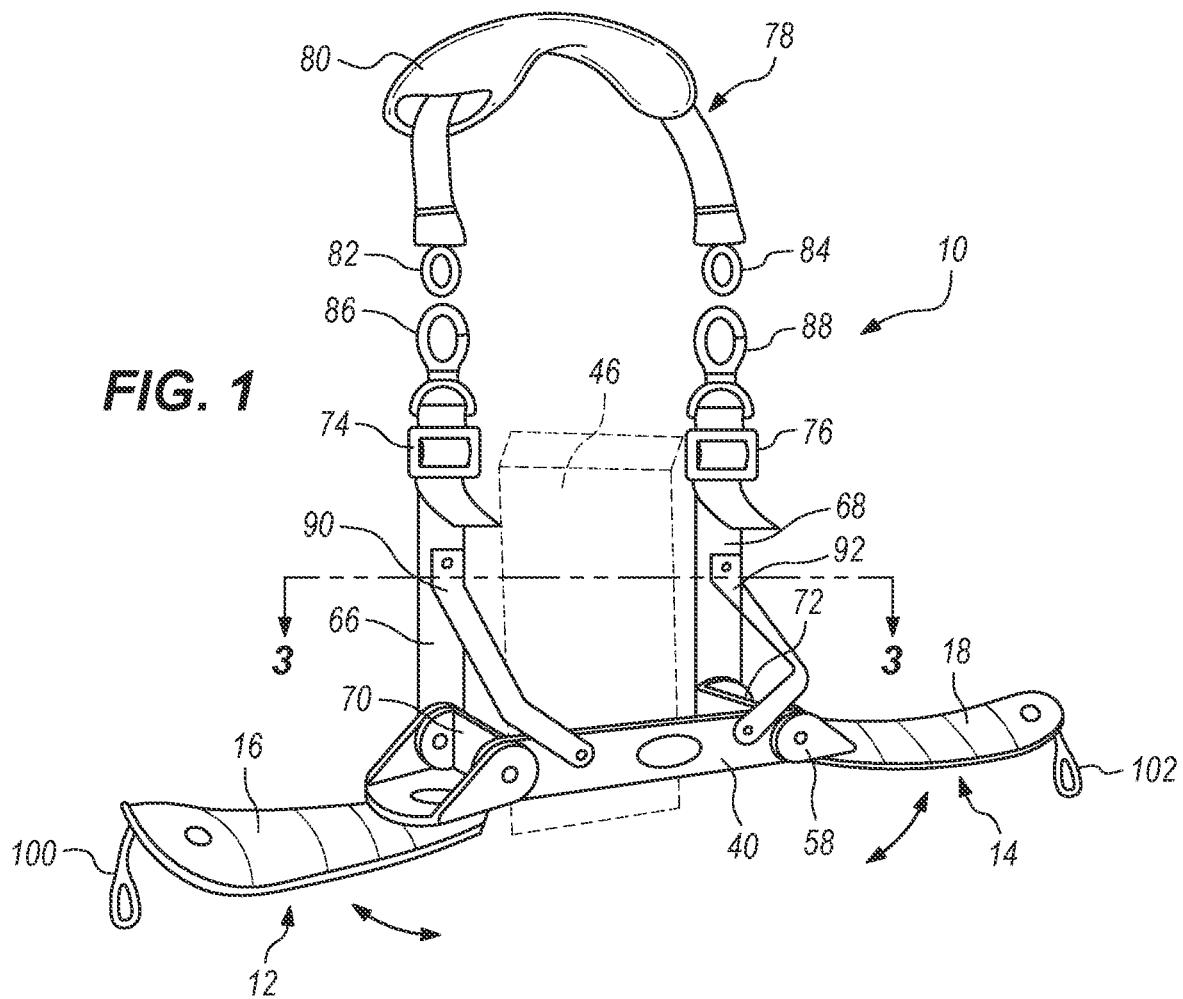
FIG. 1 is a front left side perspective view of the apparatus of the present application.

FIG. 1 shows the support device of the present application as a whole and is identified by reference character 10. Support device 10 includes as its elements platforms 12 and 14. Platforms 12 and 14 include surfaces 16 and 18 which are intended to support the two arms, specifically the elbows of the user.

Figure 2:
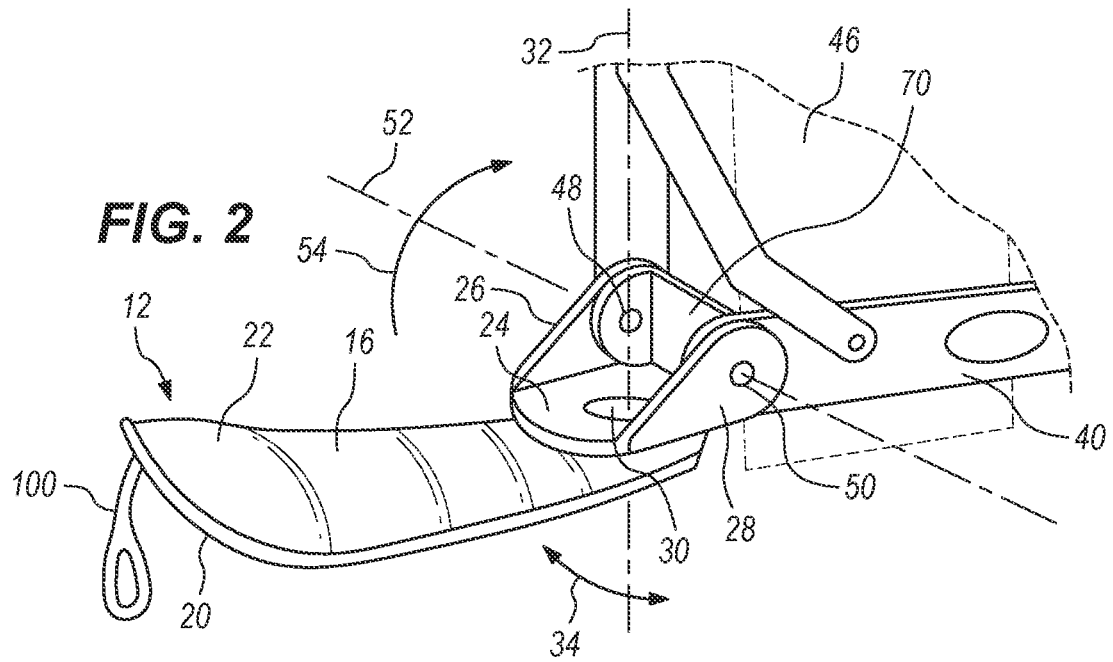
FIG. 2 is an enlarged perspective view of one of the platform mechanisms of the apparatus of the present application depicted in FIG. 1.

With reference to FIG. 2, the particulars of the platform 12 are depicted and it should be realized that the same description applies to platform 14, shown in FIG. 1. Platform 12 includes a rigid base 20 and an overlying pad 22. A plate 24 is also found in the device 10 of the present application and possesses flanges 26 and 28 connected thereto. Platform 12 rotatably connects to plate 24 via a rivet-like fastener 30. Thus, plate 12 rotates about axis 32, directional arrow 34. When the device is in use, such rotation would be generally horizontal, inwardly and outwardly from the torso of the user. It should be realized that platform 40 is similarly connected to a plate 36 and is able to rotate about axis 38, best shown in FIG. 3.

A bar 40 is also found in the present application. Bar 40 spans platforms 12 and 14 and forms a space 42 between itself and the torso 44 of the user, shown schematically on FIG. 3. Space 42 is employed to confine a case 46 between bar 40 and torso 44 of the user.

Figure 3:
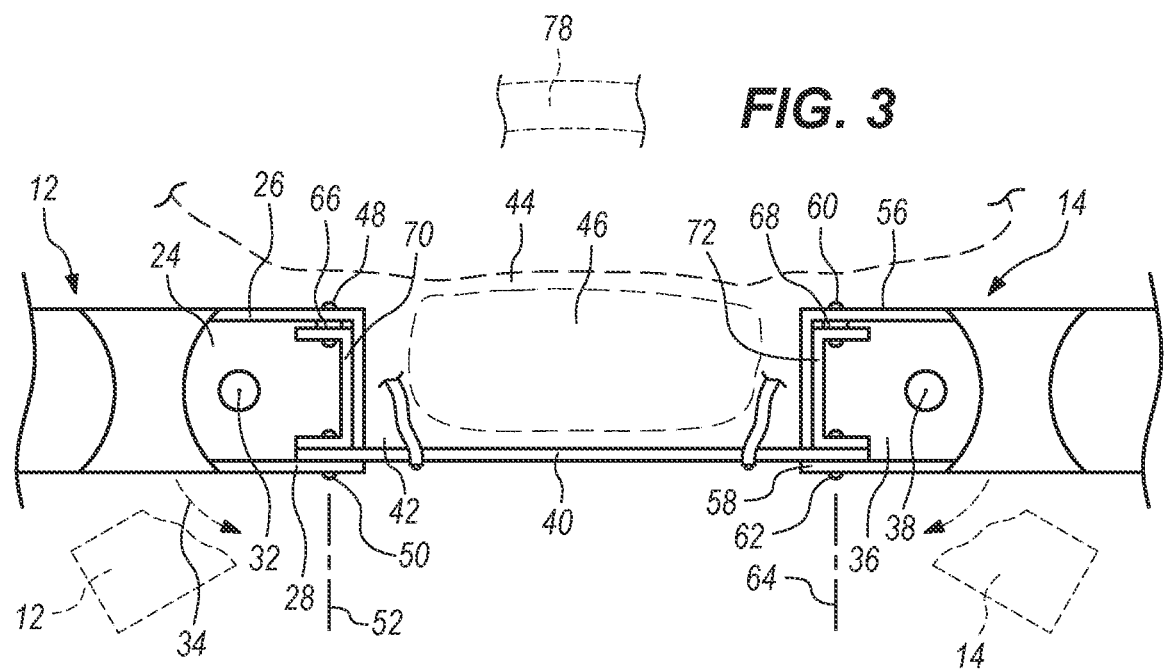
FIG. 3 is a sectional view taken along line 3-3 of FIG. 1 showing the confined case and a portion of the torso of the user in phantom.

Bar 40 is also rotatably attached to platforms 12 and 14. Returning to FIG. 2, it may be observed that rivets 48 and 50 pass through flanges 26 and 28 and allow the rotational connection of platform 12 relative to bar 40. Thus, platform 12 is permitted to rotate about axis 52, directional arrow 54. Such rotational movement is generally in a vertical direction relative to the user of device 10. FIG. 3 illustrates the rotational connections of platforms 12 and 14 and, specifically, platform 14 through the use of flanges 56 and 58 and rivets 60 and 62. Needless to say, platform 14 is then able to rotate about axis 64. Movement of platform 12 about axis 52 and platform 14 about axis 64 permits the compact storage of device 10 when not in use.

Returning to FIG. 1, it may be seen that straps 66 and 68 are also employed with device 10. Straps 66 and 68 extend from plates 26 and 56, respectively. Brackets 70 and 72 squeeze or pinion straps 66 and 68 in place such that platforms 12 and 14 rotating about bar 40 also rotate relative to straps 66 and 68. Buckles 74 and 76 allow the adjustment of straps 66 and 68 relative to the torso 44 of the user. Neck piece 78 includes a neck pad 80 and rings 82 and 84 which connect to clips 86 and 88 extending from straps 66 and 68.

Straps 90 and 92 extend between bar 40 and straps 66 and 68, respectively to further support platforms 12 and 14 when in place.

Figure 4:
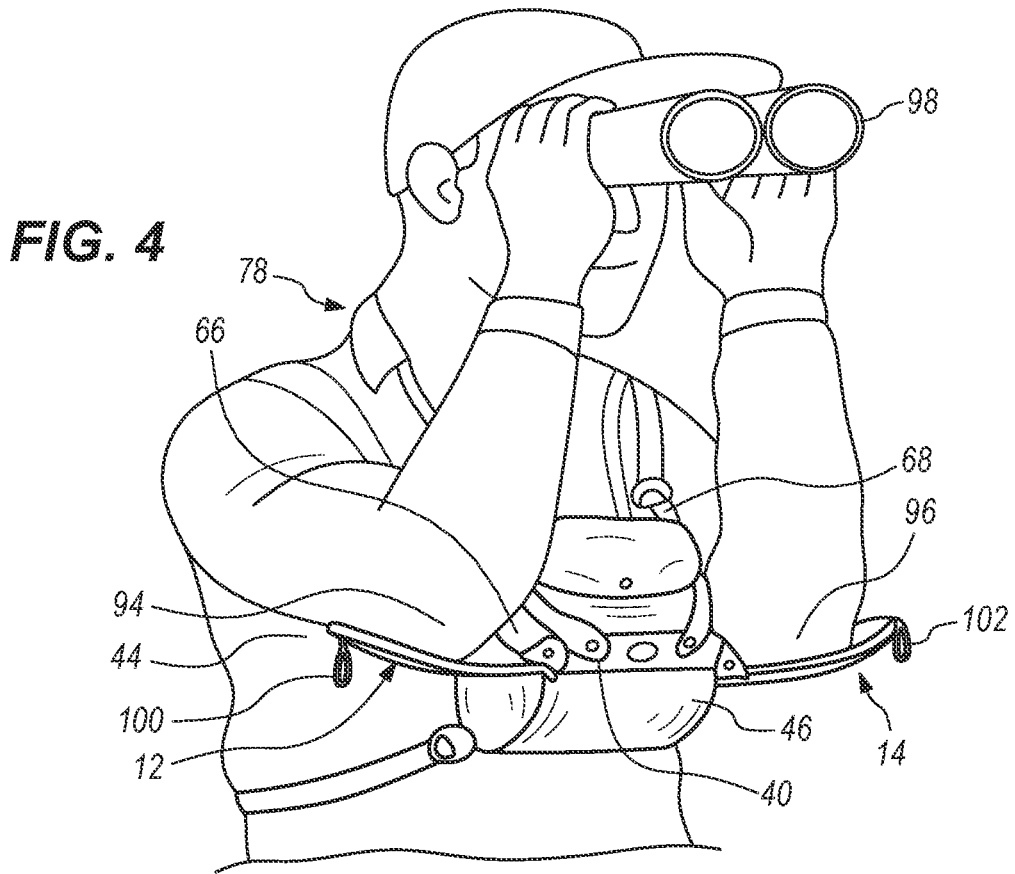
FIG. 4 is a left side front perspective view of the device of the present application mounted on a user holding a pair of binoculars.

In operation, the user uses platforms 12 and 14 to allow the resting of elbows 94 and 96 of the user, FIG. 4. Straps 66 and 68 are employed to hold platforms 12 and 14 in this position and are further secured by the use of neck piece 78 which extends about the back of the user's neck. Buckles 74 and 76 are again adjusted to provide the proper height of platforms 12 and 14 in order to allow the comfortable resting of elbows 94 and 96 thereupon. Case 46, which may have been used for storage of the optical piece now being employed by the user, in this case binoculars 98, fits in space 42 behind bar 40. Loops 100 and 102 aid in the movement of platforms 12 and 14 in an upward direction about axis 52 and 64, respectively, for storage of device when not in use.

While in the foregoing, embodiments of the application have been set forth in considerable detail for the purposes of making a complete disclosure of the invention, it may be apparent to those of skill in the art that numerous changes may be made in such details without departing from the spirit and principles of the application.

What is claimed is:

1. A support device for resting two arms of a user and for confining a case adjacent a torso of the user when manipulating an optical item, comprising:
   a first platform and a spaced second platform, each of said first and second platforms comprising a proximal portion and a distal portion, said first and second platforms further including first and second surfaces for supporting the two arms of the user;
   a first plate and a second plate, said first plate being rotatably attached to said proximal portion of said first platform, said second plate being rotatably attached to said proximal portion of said second platform;
   a first flange connected to and extending outwardly from said first plate;
   a second flange connected to and extending outwardly from said second plate;
   a bar, said first and second flanges each rotatably attached to said bar, said bar for forming a space relative to the torso of the user confining a base adjacent the torso of the user;
   a third flange connected to and extending from said first plate;
   a fourth flange connected to and extending from said second plate;
   a first strap rotatably attached to said third flange; and
   a second strap rotatably attached to said fourth flange.

2. The device of claim 1 which further comprises a third strap, said third strap being connected to said bar and said first strap, and further comprises a fourth strap, said fourth strap being connected to said bar and to said second strap.

3. The device of claim 1 which additionally comprises a first bracket positioned between said first flange and said third flange and a second bracket positioned between said second flange and said fourth flange, said bar being located between said first flange and said first bracket and being located between said second flange and said second bracket, said first strap being located between said third flange and said first bracket and said second strap being located between said fourth flange and said second bracket.

\* \* \* \* \*